(12) United States Patent
Neri (10) Patent No.: US 10,788,852 B2
(45) Date of Patent: Sep. 29, 2020

(54) POWER SUPPLY SWITCHING CIRCUIT

(71) Applicant: u-blox AG, Thalwil (CH)

(72) Inventor: Filippo Neri, Thalwil (CH)

(73) Assignee: u-blox AG, Thalwil (CH)

( * ) Notice: Subject to any disclaimer, the term of this patent is extended or adjusted under 35 U.S.C. 154(b) by 0 days.

(21) Appl. No.: 16/093,341

(22) PCT Filed: Apr. 14, 2016

(86) PCT No.: PCT/EP2016/058296
§ 371 (c)(1),
(2) Date: Oct. 12, 2018

(87) PCT Pub. No.: WO2017/178060
PCT Pub. Date: Oct. 19, 2017

(65) Prior Publication Data
US 2019/0187738 A1 Jun. 20, 2019

(51) Int. Cl.
*G05F 3/24* (2006.01)
*H02J 1/10* (2006.01)

(52) U.S. Cl.
CPC . *G05F 3/24* (2013.01); *H02J 1/10* (2013.01)

(58) Field of Classification Search
None
See application file for complete search history.

(56) References Cited

U.S. PATENT DOCUMENTS

| 4,812,672 A | 3/1989 | Cowan et al. | |
|---|---|---|---|
| 6,853,098 B1 * | 2/2005 | Jackson | H02J 1/108 307/127 |
| 9,735,614 B2 * | 8/2017 | Batra | H02J 9/061 |
| 2004/0217653 A1 | 11/2004 | Neidorff | |
| 2014/0361790 A1 | 12/2014 | Nakanishi et al. | |

FOREIGN PATENT DOCUMENTS

EP   0 700 048 A1   3/1996

OTHER PUBLICATIONS

International Search Report and Written Opinion dated Feb. 15, 2017, in International Application No. PCT/EP2016/058296 (14 pgs.).

* cited by examiner

*Primary Examiner* — Jue Zhang
*Assistant Examiner* — Henry E Lee, III
(74) *Attorney, Agent, or Firm* — Finnegan, Henderson, Farabow, Garrett & Dunner LLP (57) ABSTRACT

Disclosed is a power supply switching circuit comprising: a first switch pair for selectively connecting a first power supply node to an output node, a second switch pair for selectively connecting a second power supply node to the output node; and a switch control circuit. The switch control circuit is operable such that a first switch of each of the first switch pair and the second switch pair is controlled by a respective first control signal and a second switch of each of the first switch pair and the second switch pair is controlled by a respective second control signal, so as to connect no more than one of the first power supply node or the second power supply node to the output node at any one time.

31 Claims, 4 Drawing Sheets

POWER SUPPLY SWITCHING CIRCUIT

CLAIM FOR PRIORITY

This application is a U.S. national phase entry under 35 U.S.C. § 371 from PCT International Application No. PCT/EP2016/058296, filed Apr. 14, 2016, from which this application claims priority and which is incorporated herein by reference.

The present invention relates to power supply switching circuits for switching between a first power supply and a second power supply.

Integrated circuits require at least one power supply (e.g., a main power supply) to operate. There are situations however where it is beneficial to provide at least one additional power supply in parallel with the main power supply. In systems requiring very high reliability for instance, a redundant or "backup" power supply is necessary in case the main power supply fails or falls below a certain voltage or current level. In such situations power could still be supplied to the circuit or system via the backup power supply.

Devices which implement a standby or "sleep" mode may also comprise an additional power supply in parallel with the main power supply. In this situation, unlike the previous one, the connection to the main power supply is deliberately interrupted in order to save power. For example, during the standby mode, the device may use a low-power supply (e.g. a battery) to power only a few critical circuits which the device needs to resume operation once it reawakens. Critical circuits may include, for example, volatile memory and real-time clocks (RTC) because of the data loss which typically occurs during a power-down. Upon awakening, the powering of the device would revert back to the higher-power main power supply.

In either situation, or in other situations implementing two power supplies, a means for switching between the two power supplies is required such that at any one time only one power supply is connected to the circuit or load. In other words, it is important that the two or more power supplies always remain isolated from one another. If this condition is not met, one of the power supplies (usually the smaller of the two power supplies) will sink current from the other power supply. The larger power supply will consequently go into current limit as a result of the reverse current. If the power supply persists in this current limit state it may not only damage the supply but the switch connected to the supply receiving the current may also be damaged. In the situation where both power supplies are of equal power (and have equal current capability), if no isolation is provided between the supplies, both will supply power to the load or circuit. In the case where one of the supplies is a battery then the battery will be continually drained and may not be able to provide sufficient power to the load when the main power supply does fail.

It is also important that a device (e.g., a switch) connected to any of the power supplies can withstand the full voltage dissipated across it. If this is not the case, the device may be damaged due to the excessive voltage (above its rating) appearing at or across any of its terminals. This is particularly true of semiconductor devices which have limits to the amount of power they can absorb. In particular, as semiconductor devices have become smaller, in conformity with "Moore's Law", their physical junctions have become smaller and therefore less able to handle larger voltages. However, many devices still require larger power supply voltages to operate. As such, it becomes more difficult to implement switching circuits in smaller node fabrication processes, in particular those processes which do not offer high-voltage devices, i.e., devices capable of tolerating voltages much larger than the nominal supply (for example a 28 nm CMOS process). One solution is to use off-chip, higher powered switches to handle the power supply switching at such process nodes. This results in an increase in size and cost.

It is desirable, therefore, to provide a switching circuit for switching between first and second power supplies while ensuring the power supplies remain mutually isolated. It is also desirable to provide a switching circuit for switching between first and second power supplies, wherein the breakdown voltage limit of its constituent switches or other devices may be smaller than the voltage level of at least one of the power supplies without being damaged.

SUMMARY OF INVENTION

In a first aspect of the invention there is provided a power supply switching circuit comprising:
a first switch pair for selectively connecting a first power supply node to an output node;
a second switch pair for selectively connecting a second power supply node to said output node; and
a switch control circuit operable such that a first switch of each of said first switch pair and said second switch pair is controlled by a respective first control signal and a second switch of each of said first switch pair and said second switch pair is controlled by a respective second control signal, so as to connect no more than one of said first power supply node or said second power supply node to said output node at any one time.

In a second aspect of the invention there is provided a power supply switching circuit comprising:
one or more first switches for selectively connecting a first power supply node to an output node;
one or more second switches for selectively connecting a second power supply node to said output node; and
a switch control circuit comprising a first current source for providing a first current and a second current source for providing a second current, said switch control circuit being operable such that one or more first control signals for said one or more first switches and one or more second control signals for said one or more second switches are derived from said first current and/or said second current.

Further optional aspects of the invention are as disclosed in the appended dependent claims.

BRIEF DESCRIPTION OF THE DRAWINGS

Embodiments of the invention will now be described, by way of example only, by reference to the accompanying drawings, in which.

DETAILED DESCRIPTION OF THE EMBODIMENTS

There are various known techniques for connecting two power supplies to a common load or circuit which provide the required isolation. Such techniques may employ power supply switching circuits, sometimes referred to as power supply multiplexing (or simply power multiplexing) circuits. The following discusses some of the approaches used.

Figure 1:
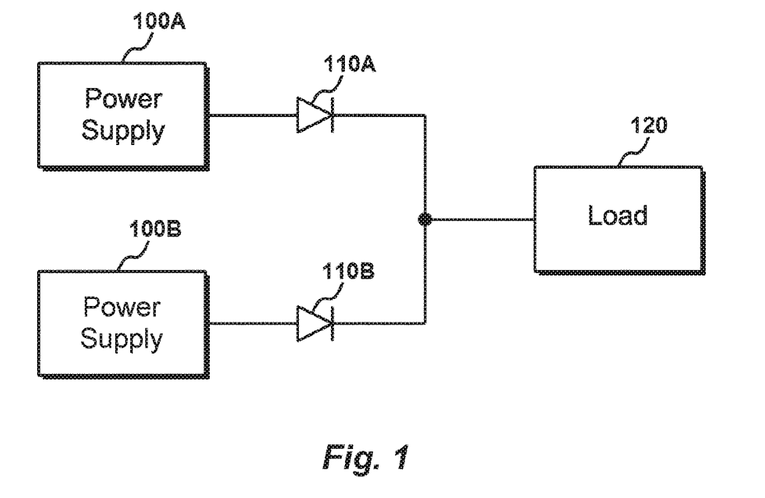
FIG. 1 is a schematic diagram of a first prior art power supply switching circuit.

FIG. 1 is a schematic drawing of a known arrangement for interconnecting a first power supply (e.g., a primary power supply) and a second power supply (e.g., a secondary power supply) to a common load by using the OR-diode circuit arrangement. The arrangement comprises a series connection of a first power supply 100A and first diode 110A in parallel with a series connection of a second power supply 100B and second diode 110B. The cathodes of each diode 110A, 110B and connected together and coupled to a common load 120 whereas the anode of diode 110A is connected to the first power supply 100A and the anode of diode 110B is connected to the second power supply 100B.

Assuming the voltage provided to the load 120 by the first power supply 100A is more than a diode drop larger than that of the second power supply 100B, the load 120 will be powered by the first power supply 100A. If the first power supply 100A fails or its voltage falls more than a diode drop below that of the second power supply 100B, the supply of power is switched to the second power supply 100B. The advantage of this circuit lies in its simplicity and the fact that each diode 110A, 110B is reversed biased for a current flow into its corresponding power supply 100A, 100B. Therefore the circuit prevents a reverse current flow for any voltage below the diode's reverse breakdown voltage.

A key disadvantage of using such an arrangement to interconnect two power supplies is that the voltage appearing at the load 120 is always one diode forward voltage drop lower than the corresponding voltage supplied by the power supply, due to the forward junction potential of the corresponding conducting diode 110A, 110B. This is particularly a problem in modern electronic systems powered by low-voltages. For example, while a 0.6-0.7V drop across a silicon diode might be acceptable in a 10V system (<10% loss), this presents a formidable problem in electronic systems powered by a 1V supply (>70% loss).

Using diodes which present a lower forward-junction potential can help to mitigate this problem. Germanium diodes have a forward-junction potential of only around 0.3V which makes them preferable to silicon diodes in terms of power loss. However, compared to silicon diodes they also have a leakage current which is very sensitive to the effects of temperature changes. Schottky diodes also have a forward-junction potential of 0.3V, however they can have a larger reverse current and are usually larger, thus more expensive than standard diodes.

Figure 2:
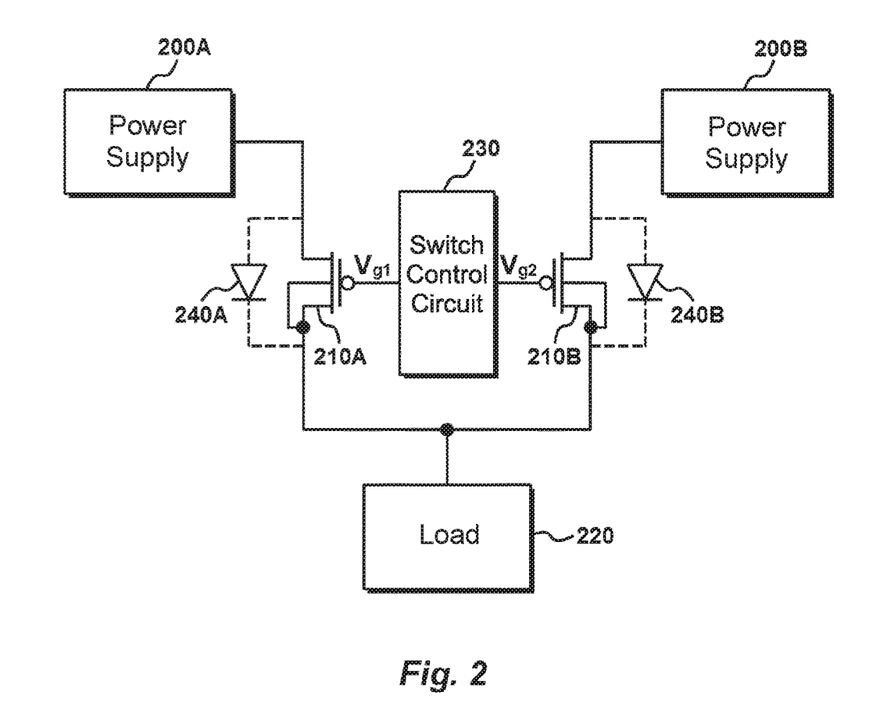
FIG. 2 is a schematic diagram of a second prior art power supply switching circuit.

FIG. 2 is a schematic drawing of an alternative known arrangement for connecting two power supplies to a common load which overcomes some of the problems of the arrangement of FIG. 1. In this arrangement, each diode 110A, 110B has been replaced by a switch 210A, 210B between its respective power supply 200A, 200B and the load 220. Each switch 210A, 210B may comprise any switching device such as a metal-oxide semiconductor (MOS) field-effect transistor (FET), or MOSFET (or any other suitable transistor or other switching device).

The MOSFET switches 210A, 210B operate such that when one switch (e.g., switch 210A) is in an ON-state to connect its respective power supply 200A to the load 220, the other switch 210B is in an OFF-state to isolate its respective power supply 200B from the load 220, and vice versa. This operation is achieved by appropriately controlling the voltage $V_{g1}$, $V_{g2}$ at the control terminal (gate terminal) of each switch 210A, 210B. Hence, compared to the arrangement illustrated in FIG. 1, this arrangement has the disadvantage of requiring a dedicated switch control circuit 230 to the control the switches 210A, 210B such that only one power supply 200A, 200B is connected to the load 220 at any one time.

Each switch 210A, 210B (being a MOSFET) has a respective intrinsic body diode 240A, 240B formed between the substrate (bulk) and the flow terminal (source or drain terminal) to which the substrate is not connected (the shorted intrinsic body diode between the substrate and other flow terminal is not shown). When a switch (e.g., switch 210B, although this point is equally applicable to switch 210A) is conducting, i.e. in the ON-state, the current flows through the switch 210B and negligible current from the power supply 200B flows through the corresponding intrinsic body diode 240B. This is because in the conductive state the drain-source path of the switch 210B has much lower resistance than the intrinsic body diode 240B. Therefore, the only voltage drop appearing across the switch is that arising from the drain-source potential, which is typically much smaller than a diode drop when the switch 210B is operating in the linear region. This makes this approach suitable for low-power design.

As with the arrangement of FIG. 1, this arrangement has the disadvantage that it is not possible to arbitrarily choose the voltages supplied by the power supplies 200A, 200B. The voltages supplied by power supplies 200A, 200B are still required to be within one diode drop (i.e. 0.6-0.7V for silicon diodes) of one another. If the voltage of an "isolated" power supply (e.g. second power supply 200B) is greater than a diode drop of the voltage being applied to the load 220 from the active power supply, it will forward bias the corresponding intrinsic body diode 240B and hence supply the load 220 with power irrespective of whether the switch 210B is in the OFF-state. It should also be evident that if the currently active power supply fails in this circuit (e.g., first power supply 200A), the intrinsic body diode 240B of the switch connected to the "isolated" supply 200B will be forward biased, thus creating a reverse current into the failed supply 200A.

In this circuit arrangement it is important that switches 210A, 210B can tolerate the voltage applied across their drain-source and gate-source terminals. Furthermore, the voltage potential between the drain-source and source-gate terminals should not exceed the maximum rating for the devices (i.e. breakdown voltages $V_{DS\text{-}Max}$ and $V_{GS\text{-}Max}$), otherwise they could be damaged and give rise to circuit reliability issues. In order to allow the maximum possible power supply voltages to be connected to the load, switches 210A, 210B need to be implemented using the highest voltage transistors supported by the technology. However, most technology nodes do not provide transistors capable of withstanding the high voltages used by power supplies and batteries. This is especially true of the newer technologies offered by foundries. As devices shrink in size, their oxide layers become thinner and, as a result, their breakdown voltages become smaller. For example, the largest voltage devices available in Global Foundry's 28 nm CMOS process have a maximum gate-source breakdown voltage $V_{GS}$ of 1.8V, which is considerably lower than a 3V battery for example.

Figure 3:
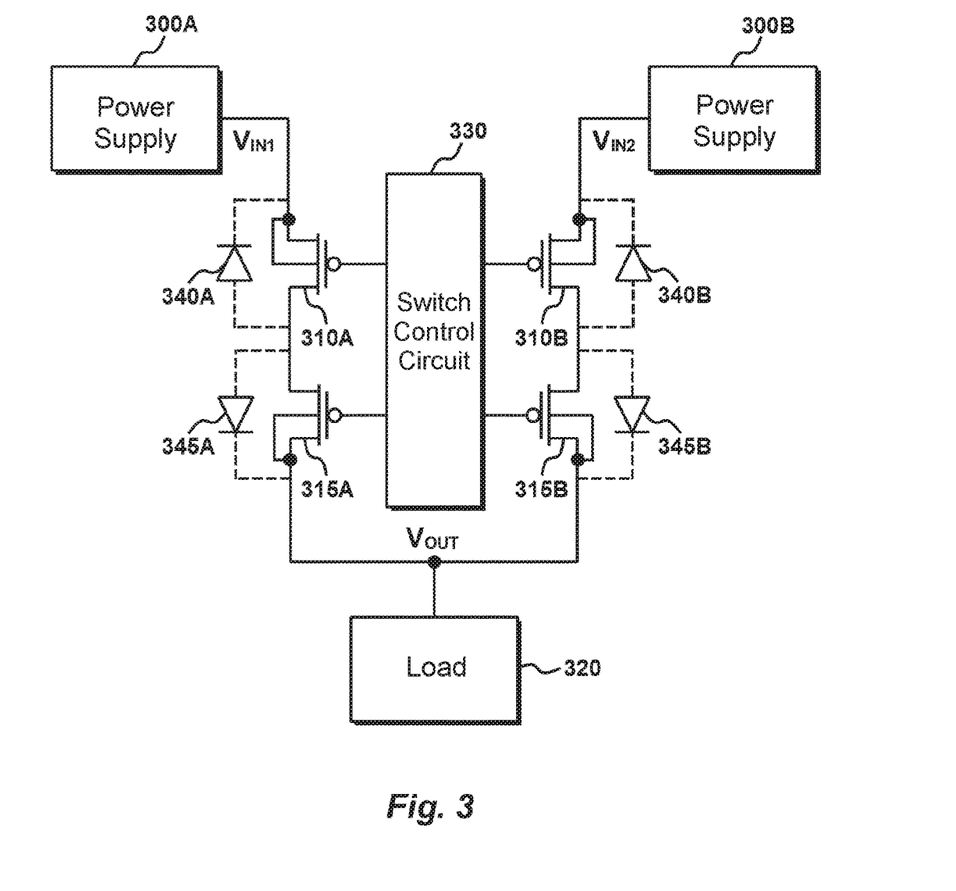
FIG. 3 is a schematic diagram of a power supply switching circuit according to a first embodiment of the invention.

FIG. 3 shows an exemplary power supply switching circuit which addresses the problems described above in relation to the arrangements depicted in FIGS. 1 and 2. The switching circuit of FIG. 3 is capable of selecting one of two independent power supplies, first power supply 300A coupled to first power supply node $V_{IN1}$ and second power supply 300B coupled to second power supply node $V_{IN2}$, to feed a load 320, attached to output node $V_{OUT}$, with power. The circuit comprises a first switch pair selectively coupling the first power supply 300A to the load 320 and a second switch pair selectively coupling the second power supply 300B to the load 320. In the depicted embodiment, the first switch pair and the second switch pair each comprise a first switch 310A, 310B coupled in series with a second switch 315A, 315B. A switch control circuit 330 provides first control signals $V_{B1}$, $V_{B2}$ for switches 310A, 310B and second control signals $V_{B3}$, $V_{B4}$ for switches 315A, 315B. As such, the control terminals (gate terminals) of the switches 310A, 310B, 315A, 315B are each individually controlled via the first and second control signals generated by the switch control circuit 330. In the illustrated example, each switch 310A, 310B, 315A, 315B comprises p-channel switch-MOSFETS. Specifically, switches 310A, 310B, 315A, 315B may comprise Laterally Diffused MOSFETs (or LD-MOSFETs). LD-MOSFETs are asymmetric power transistors fabricated with an epitaxial silicon layer placed on a highly doped silicon substrate so that they are able to withstand high electric fields. This gives them the advantage of having a high breakdown voltage compared to standard transistors. Since their effective gate length is usually shorter than the physical length of the gate electrode, they can also operate at high speed and are thus commonly used in high-power RF applications. However, this is only an example device, and switches 310A, 310B, 315A, 315B may equally comprise any other suitable switching device, including any other type of transistor.

In an embodiment, the first and second switches 310A, 315A of the first switch pair are configured with their intrinsic body diodes 340A, 345A oppositely connected, and similarly the first and second switches 310B, 315B of the second switch pair have their intrinsic body diodes 340B, 345B so configured. This configuration creates a pair of back-to-back diodes 340A, 345A; 340B, 345B between each power supply 300A, 300B and the load 320. This configuration overcomes the problems discussed in connection with the circuit depicted in FIG. 2. Firstly, the power supply voltages can be more freely chosen independently of whether one supply voltage exceeds the other by a diode drop or more, since one of the intrinsic body diodes 340A, 345A; 340B, 345B will always be reversed biased, hence preventing the reverse flow of current. Secondly, if one of the power supplies fails, the other power supply is prevented from sourcing current to the failed supply and thus potentially damaging the operating supply.

Figure 4:
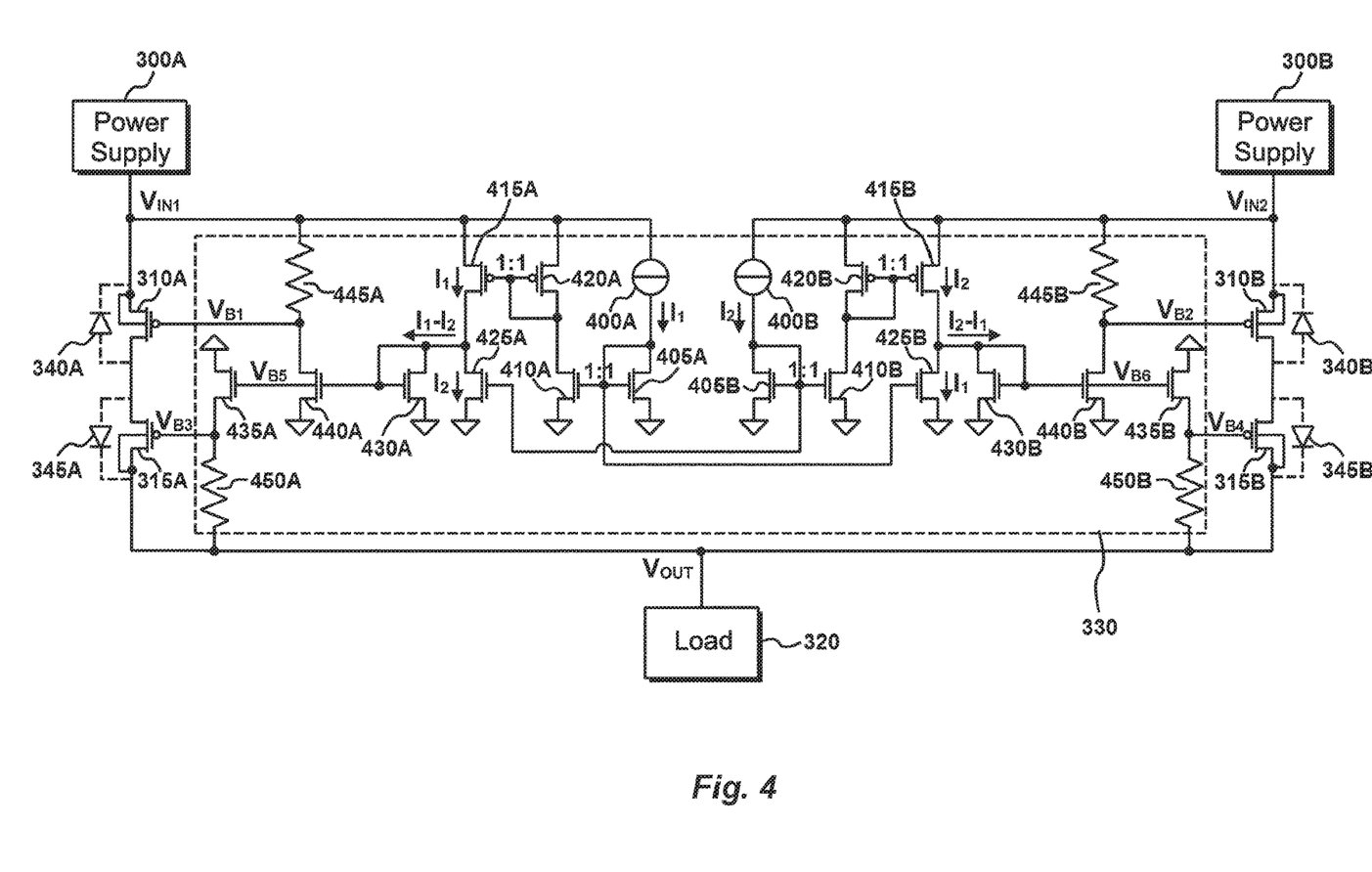
FIG. 4 is a schematic diagram of the power supply switching circuit of FIG. 3 with detail of the switch control circuit shown.

FIG. 4 shows the circuit of FIG. 3, with the circuit detail of an (exemplary) switch control circuit 330 shown. The switch control circuit 330 comprises a first current source 400A and a second current source 400B generated on-chip from the first power supply 300A and the second power supply 300B, respectively. These current sources are used to generate the necessary control signals for the switches 310A, 310B, 315A, 315B to ensure that only one power supply feeds the load 320 at any one time. A description of how the switch control circuit 330 controls the switches 310A, 310B, 315A, 315B will now be provided. Note that because the circuit is symmetrical, only the operation of the switch control circuit 330 shown on the left-hand side (LHS) is discussed in detail for brevity.

First current source 400A generates a first current $I_1$ thereby setting the drain current of reference device 405A. This first current $I_1$ is mirrored to the drain of mirroring device 410A by virtue of the current mirror connection formed between reference device 405A and mirroring device 410A. Similarly, the current mirror formed between mirroring device 415A and reference device 420A produces a copy of first current $I_1$ which flows through the drain of mirroring device 415A. A second current $I_2$ generated from the second current source 400B in the right-hand side (RHS) sub-circuit of the switch control circuit 330 is mirrored over to mirroring device 425A via the current mirror formed between reference device 405B and mirroring device 425A. The junction of first current $I_1$ and second current $I_2$ at the drain of mirroring device 425A produces a differential current $I_1-I_2$ (subtraction) which flows through the diode-connected device 430A to create a third control signal (bias voltage) $V_{B5}$. This bias voltage $V_{B5}$ biases the gates of control device 435A and control device 440A. Assuming first current $I_1$ is substantially greater than second current $I_2$, a sufficiently high bias voltage $V_{B5}$ is generated. This causes both control device 435A and control device 440A to conduct, pulling down their respective drain voltages (second and first control signals) $V_{B3}$ and $V_{B1}$. This action turns "ON" switches 315A and 310A allowing the load 320 to be supplied with power from the first power supply 300A. It should be noted that the term "conduct", when referring to control devices 435A and 440A, is used very loosely as they can operate in the linear region as switches or in saturation (either sub-threshold or over-threshold). In other words, control devices 435A and 440A are not limited to a particular mode of operation.

As previously mentioned, the switch control circuit 330 ensures that only one power supply is connected to the load at any one time. In a specific example, the first power supply 300A may be connected to the load by default. This is accomplished by designing the switch control circuit 330 such that the first current $I_1$ is greater than second current $I_2$ when both power supplies 300A, 300B are operating normally. In other words, the current sources 400A, 400B are designed to be significantly unbalanced. Of course, the switch control circuit 330 may operate with the second power supply 300B being connected to the load by default by having first current $I_1$ smaller than second current $I_2$ when both power supplies 300A, 300B are operating normally. Either way, apart from this detail, the LHS and RHS sub-circuits of switch control circuit 330 are designed to be symmetrical.

Owing to the symmetry, the switch control circuit 330 shown on the RHS operates in a similar fashion. The only difference is current $I_2$ is similarly mirrored across to mirroring device 415B where it meets current $I_1$ mirrored from reference device 405A. In other words the currents $I_1$ and $I_2$ are swapped with respect to those flowing in the analogous sub-circuit shown on the LHS. The result of this arrangement is the generation of a differential current $I_2-I_1$ flowing through the diode-connected device 430B to produce a fourth control signal (bias voltage) $V_{B6}$ which biases control devices 435B and 440B. Continuing with the previous example where current $I_1$ is designed to be larger than current $I_2$, this results in diode-connected device 430B being current 'starved'. As a consequence, bias voltage $V_{B6}$ is pulled low, switching off control devices 435B and 440B. As a result, first control signal $V_{B2}$ is pulled high to second power supply node voltage $V_{IN2}$ and second control signal $V_{B4}$ is pulled high to output node voltage $V_{OUT}$ (which will be the first power supply node voltage $V_{IN1}$ in this specific example configuration). This ensures that switches 310B and 315B remain OFF and thus prevent a reverse current flowing from the first power supply 300A.

One notable (optional) feature of the switch control circuit 330 is the way that the second control signal $V_{B3}$, $V_{B4}$ for at least one of switches 315A, 315B (e.g., the switches with intrinsic body diode 345A, 345B in a forward biased orientation with respect to a current flow from the respective power supply node $V_{IN1}$, $V_{IN2}$ to output node $V_{OUT}$) is developed. The drain of control device 435A is connected to output node $V_{OUT}$ via load device 450A (note control device 435A is drawn upside down for convenience, i.e. it has the same gate-source voltage as device 440A), instead of being connected to the first power supply node voltage $V_{IN1}$. The drain of control device 440A is connected to first power supply node $V_{IN1}$ via load device 445A. Consequently, when control devices 435A and 440A are conducting, they both source power from the first power supply 300A. Although this arrangement has no advantage when control device 435A is conducting, it ensures the switch 315A remains OFF when power is intentionally sourced from the other power supply 300B, irrespective of the power supply voltages used. Load device 450B may be similarly connected to output node $V_{OUT}$ (as is shown). Alternatively, this functionality may be achieved with only one of load devices 450A, 450B so connected to output node $V_{OUT}$, and the other load device connected to its corresponding power supply node $V_{IN1}$, $V_{IN2}$ as appropriate.

Figure 5:
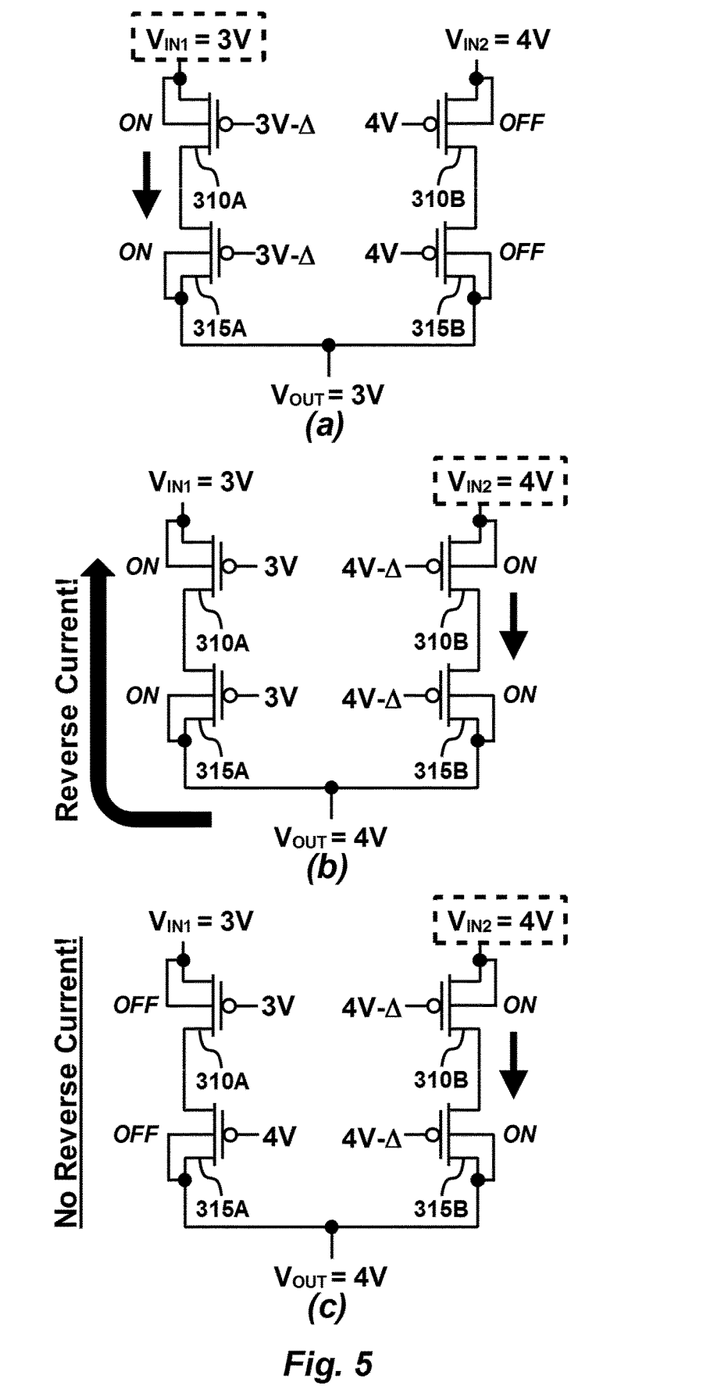
FIG. 5 illustrates operation of (a) power supply switching circuit of a second embodiment in a first operational configuration; (b) a power supply switching circuit of a second embodiment in a second operational configuration and (c) the power supply switching circuit of FIG. 4 in an operational configuration.

FIG. 5 illustrates this technical effect by showing three separate examples. In the first example of FIG. 5(a), the bias for switches 310A and 315A is referred to an exemplary voltage of 3V applied to the first power supply node $V_{IN1}$, and the bias for switches 310B, 315B is referred to an exemplary voltage of 4V applied to second power supply node $V_{IN2}$. The term "referred" is to be taken to mean, where a first flow terminal of a load device is connected to the gate of its corresponding switch, the connection of the second flow terminal of that load device. Here the switch control circuit 330 is controlled to power a load at output node $V_{OUT}$ with the 3V supply at the first power supply node $V_{IN1}$. This is achieved by applying the voltage at the first power supply node $V_{IN1}$ less a delta voltage, i.e. 3V-Δ, to the control terminal of switches 310A, 315A. Switches 310B and 315B on the other hand have the voltage applied to the second power supply node $V_{IN2}$, i.e. 4V, applied to their control terminals. In this case switches 310B and 315B are in the OFF-state as desired. However, FIG. 5(b) illustrates that the same is not true if it is desired to power the load with the 4V power supply at the second power supply node $V_{IN2}$. Although it is intended to control switches 310A and 315A so they are OFF, by applying the voltage at the first power supply node, i.e. 3V at their control terminals, it is clear switch 315A and consequently switch 310A will turn 'ON' since the source voltage (4V) exceeds the gate voltage (3V). FIG. 5(c) illustrates the arrangement discussed above, where the gates of switch 315A and 315B are biased with the voltage at output node $V_{OUT}$ instead of the voltage at the respective power supply node $V_{IN1}$ or $V_{IN2}$. It can be seen for this arrangement that the reverse current situation illustrated by FIG. 5(b) would be prevented. This is because the minimum source gate voltage would always be zero (irrespective of the power supply voltages) which is insufficient to turn on switches 315A, 315B. Therefore, for the circuit to operate more reliably, the drain terminals of transistor 435A and/or 435B may be connected via its respective load device 450A and/or 450B to output node $V_{OUT}$ and not to a power supply node $V_{IN1}$, $V_{IN2}$ as would be customary to do.

It is important to note that, while the exemplary switch control circuit 330 shows a symmetrical arrangement with both second control signals $V_{B3}$, $V_{B4}$ referred to the output voltage $V_{OUT}$, it is only necessary for only one of control signals $V_{B3}$, $V_{B4}$ to be so referred (with the other referred to its corresponding power supply node $V_{IN1}$, $V_{IN2}$ in the customary fashion). As such, to achieve the effect illustrated by FIG. 5, the drain of any one or both of control devices 435A, 435B may be connected (via respective load devices 450A, 450B) to the output node $V_{OUT}$.

Another notable feature of the circuit of FIG. 4, is that it is able to switch high-voltage power supplies in a low-voltage process technology without the need for high-voltage transistors. For example, in a 28 nm process, LDMOS transistors are rated for a maximum gate-source voltage of 1.8V and a maximum drain-source voltage of 5V. However, by using a power supply switching circuit as described herein, it is possible to switch power supplies with voltage outputs larger, possibly 2, 3 or more times larger, than the gate-source breakdown voltages of the switches 310A, 310B, 315A, 315B. This means that switches 310A, 310B, 315A, 315B do not need to be high-voltage devices and therefore, for example, can be integrated on the same die with the switch control circuit 330. As such, the power supply switching circuits disclosed herein, such as those illustrated in FIGS. 3 and 4, may comprise a single integrated circuit.

There are a number of features which allow this use of standard switches to switch relatively high voltage power supplies. One such feature is the derivation of the control signals $V_{B1}$, $V_{B2}$, $V_{B3}$, $V_{B4}$ for the switches 310A, 310B, 315A, 315B from a differential current instead of from a differential voltage, as is customary. This means that the voltage difference between the control and flow electrodes (i.e., the gate-source voltage) of any of the reference devices 405A, 405B, 420A, 420B and mirroring devices 410A, 410B, 415A, 415B, 425A, 425B, comprised within the switch control circuit 330, will never be greater than a diode forward voltage drop. Note that all of these devices may be implemented as transistors, and more specifically MOSFETs. The current mirrors are implemented with all the reference devices in a diode-connected configuration (as of course are diode-connected devices 430A, 430B), which means that they, nor the mirroring devices, cannot be over-biased.

Another feature allowing the use of standard switches is the appropriate selection (e.g., sizing) of the load devices 445A, 445B, 450A, 450B such that maximum voltage difference between the control and flow electrodes (i.e., the gate-source voltage) of switches 310A, 310B, 315A, 315B does not exceed the maximum allowed gate-source voltage supported by the process (i.e., their breakdown voltage). It should be noted that the gate-source voltage for each of the switches 310A, 310B, 315A, 315B will be equal to the voltage drop across its respective load device 445A, 445B, 450A, 450B (i.e., the load device at the gate of that switch). Therefore the load devices 445A, 445B, 450A, 450B should be chosen (e.g., sized) such that there is never a voltage drop across them which is greater than the maximum allowed gate-source voltage for the switch. Load devices 445B and 450B in the RHS sub-circuit may (optionally) be sized essentially identical to load devices 445A and 450A, respectively. It should be appreciated that, while load devices 445A, 445B, 450A, 450B are shown as resistances in FIG. 4, they may be implemented using an active element, e.g. diode-connected (MOSFET) device, to obtain the "resistor" function. These are known as active resistors and have the advantage that they typically require less area and can reduce manufacturing costs. Such devices may ensure a set, suitably low, voltage drop across them (e.g., a diode drop). Furthermore, the resistance of active resistors can be controlled giving the possibility of a configurable backup switch circuit, e.g., to configure the switching circuit for different input voltages or to select which supply is the primary supply.

The switch control circuit described herein, which comprises current sources to generate a differential current signal for control of said switches, may be adapted to generate only one control signal per side, to control only a single switch per power supply. As such, an envisaged embodiment comprises a power supply switching circuit comprising only a single switch between each power supply node $V_{IN1}$, $V_{IN2}$ and the output node $V_{OUT}$. Such an embodiment may be similar as that illustrated in FIG. 4, but without switches 310A, 310B, and their respective control devices 440A, 440B and load devices 445A, 445B; and with switches 315A, 315B referred to their respective power supply node (i.e., with load device 450A connected to first power supply node $V_{IN1}$ and load device 450B connected to second power supply node $V_{IN2}$). Such an embodiment would generate a first control signal for switch 315A and a second control signal for switch 315B. Such an embodiment may not benefit from all the advantages described herein with reference to the four switch embodiment, but will still able to benefit from being able to switch supplies larger than the breakdown voltage of its constituent switches (and therefore the power supply switching circuit can be integrated on a single chip).

The concepts disclosed herein, as already mentioned, may be implemented in a submicron process which does not have provision for high-voltage devices. It should be noted the concepts disclosed herein could equally be implemented in a standard CMOS process which does provide high-voltage devices. In this situation however the use of only standard low-voltage devices may bring about a reduction in the required silicon area as well as cost savings.

Reference current sources 400A and 400B, although shown as independent sources, may in fact be generated from the power supplies at power supply nodes $V_{IN1}$ and $V_{IN2}$, respectively; for example via a bandgap circuit. In this way, first current $I_1$ is dependent on the voltage at first power supply node $V_{IN1}$ and current $I_2$ is dependent on the voltage at second power supply node $V_{IN2}$. Thus, should one of the power supplies fail, the corresponding supply of current will be affected. For example, if the voltage at first power supply node $V_{IN1}$ is interrupted for whatever reason, reference current source $I_1$ will tend towards zero, or at least become small.

An appropriately sized capacitor may be connected between the load 320 and ground to improve the performance of the power supply switching circuit. Specifically, such a capacitor can be used to smooth any glitches appearing at the load 320 whenever the circuit switches from one power supply to another. The capacitor should be large enough to suppress the glitches, but not overly large that the switchover from one power supply to another is unduly delayed.

It should be noted that the load 320 connected to the output of the circuit may be another circuit rather than a simple load. For example, the power supply switching circuit may be used as a battery backup switching circuit for supplying power to a small start-up circuit which itself is used to start or power up a larger system, e.g. a GNSS receiver or cellular front-end.

FIGS. 3, 4 and 5 show implementations which deploy P-channel MOSFETS (PMOS transistors) for the switches 310A, 310B, 315A, 315B. However, one suitably skilled in the art would immediately realize that it is equally possible to use N-channel MOSFETS (NMOS transistors) for the switches (or indeed other suitable devices). In applying the later implementation, a person skilled in the art would also realize that the control devices controlling the gates of switches would need to be suitably adapted, e.g. by using PMOS transistors and corresponding changes made to the current mirroring of currents $I_1$ and $I_2$.

It should be appreciated that the above description is for illustration only and other embodiments and variations may be envisaged without departing from the spirit and scope of the invention. Terms such as "coupled to" and "connected to" should be understood to encompass situations where the connection or coupling is not direct (e.g., where there may be intervening elements or devices). In the specific exemplary embodiments, all switches, mirroring devices, reference devices, control devices and diode connected devices are specifically shown as MOSFET devices, while load devices are shown as resistances. This is purely by way of example and any suitable equivalent or similar devices may be used where it is possible to do so, or where there would be little effort for the skilled person to use such a suitable equivalent or similar device. As such the switches, mirroring devices, reference devices, control devices and diode connected devices may comprise any of, and where possible, any combination of: MOSFETs, LD-MOSFETS, other transistor devices or other switching devices. Diode-connected devices may also comprise diodes, and load devices may comprise any suitable load (including transistor devices). In addition, while the current mirroring in FIG. 4 is shown as producing an exact copy of the current (1:1 ratio mirroring), it is envisaged that one or more of the (equivalent) current mirrors per side employ current mirroring of a different ratio, so as to scale the current up or down. This may be employed, for example, to reduce power consumption.

The invention claimed is:

1. A power supply switching circuit, comprising:
   a first switch pair configured to selectively connect a first power supply node to an output node;
   a second switch pair configured to selectively connect a second power supply node to the output node; and
   a switch control circuit configured to:
      respectively control first and second switches of the first switch pair by a first control signal and a second control signal;
      respectively control first and second switches of the second switch pair by a third control signal and a fourth control signal; and
      select one of the first power supply node or the second power supply node to be connected to the output node by at least one of the first and second control signals or the third and fourth control signals;
   wherein:
   the first, second, third, and fourth control signals are respectively sourced via first, second, third, and fourth control devices; and
   the first and second switches of the first and second switch pairs respectively comprise first, second, third, and fourth control terminals, wherein the first control terminal is biased by a first common node of the first control device and a first load device, the second control terminal is biased by a second common node of the second control device and a second load device, the third control terminal is biased by a third common node of the third control device and a third load device, and the fourth control terminal is biased by a fourth common node of the fourth control device and a fourth load device.

2. The power supply switching circuit of claim 1, wherein the first and second switches, in the first and second switch pairs, are connected in series, and intrinsic body diodes of the first and second switches, in the first and second switch pairs, are oppositely connected.

3. The power supply switching circuit of claim 1, wherein at least one of the second control signal or the fourth control signal is powered via the output node.

4. The power supply switching circuit of claim 1, wherein the first control signal is powered from the first power supply node, and the third control signal is powered from the second power supply node.

5. The power supply switching circuit of claim 1, wherein voltage drops across the first, second, third, and fourth load devices are respectively smaller in magnitude than breakdown voltages of the first and second switches of the first and second switch pairs.

6. A power supply switching circuit, comprising:
a first switch pair configured to selective V connect a first power supply node to an output node;
a second switch pair configured to selectively connect a second power supply node to the output node; and
a switch control circuit configured to:
respectively control first and second switches of the first switch pair by first and second control signals;
respectively control first and second switches of the second switch pair by third and fourth control signals; and
select one of the first power supply node or the second power supply node to be connected to the output node by at least one of the first and second control signals or the third and fourth control signals;
wherein the switch control circuit comprises:
a first current source configured to provide a first current; and
a second current source configured to provide a second current; and
the first and third control signals are derived from at least one of the first current or the second current, and the second and fourth control signals are derived from at least one of the first current or the second current.

7. The power supply switching circuit of claim 6, wherein the first current is generated from a first power supply connected to the first power supply node, and the second current is generated from a second power supply connected to the second power supply node.

8. The power supply switching circuit of claim 6, wherein the switch control circuit is configured to control the first and second switch pairs based on a differential current between the first and second currents.

9. The power supply switching circuit of claim 8, wherein the switch control circuit comprises a plurality of current mirrors configured to derive the differential current from the first and second current sources.

10. The power supply switching circuit of claim 9, wherein one of the current mirrors comprises a reference device in a diode-connected configuration and a mirroring device, wherein a control terminal of the reference device is connected to a control terminal of the mirroring device.

11. The power supply switching circuit of claim 6, wherein the switch control circuit is configured to:
control the first switch pair based on a first differential current between the first and second currents; and
control the second switch pair based on a second differential current between the first and second currents,
wherein the first differential current is equal to the first current minus the second current and the second differential current is equal to the second current minus the first current.

12. The power supply switching circuit of claim 6, wherein the first and second currents are different when a first power supply supplies power to the first power supply node and a second power supply supplies power to the second power supply node.

13. The power supply switching circuit of claim 1, wherein the first and second switch pairs and the switch control circuit are integrated on a single die.

14. The power supply switching circuit of claim 1, wherein:
a first voltage, greater than a breakdown voltage of a transistor, at the first power supply node is provided to the first and second switches of the first switch pair, and
a second voltage, greater than the breakdown voltage, at the second power supply node is provided to the first and second switches of the second switch pair.

15. The power supply switching circuit of claim 1, wherein the first and second switches of the first and second switch pairs comprise MOSFETs.

16. The power supply switching circuit of claim 1, wherein the switch control circuit is configured to:
control the first switch pair to connect a first power supply at the first power supply node to the output node;
control the second switch pair to isolate a second power supply at the second power supply node from the output node; and
if an output of the first power supply is below a predetermined level,
control the first switch pair to isolate the first power supply from the output node, and
control the second switch pair to connect the second power supply to the output node.

17. A power supply switching circuit, comprising:
a first switch configured to selectively connect a first power supply node to an output node;
a second switch configured to selectively connect a second power supply node to the output node; and
a switch control circuit comprising:
a first source configured to provide a first, and
a second current source configured to provide a second current;
wherein the switch control circuit is configured to control the first and second switches by first and second control signals based on a differential current between the first and second currents.

18. The power supply switching circuit of claim 17, wherein the first is generated from a first power supply connected to the first power supply node, and the second current is generated from a second power supply connected to the second power supply node.

19. The power supply switching circuit of claim 17, wherein the switch control circuit comprises:
a plurality of current mirrors configured to derive the differential current from the first and second current sources.

20. The power supply switching circuit of claim 19, wherein at least one of the current mirrors comprises a reference device in diode-connected configuration and a mirroring device, wherein a control terminal of the reference device is connected to a control terminal of the mirroring device.

21. The power supply switching circuit of claim 17, wherein the switch control circuit is configured to:
   control the first switch based on a first differential current between the first and second currents; and
   control the second switch based on a second differential current between the first and second currents,
   wherein the first differential current is equal to the first current minus the second current, and the second differential current is equal to the second current minus the first current.

22. The power supply switching circuit of claim 17, wherein the first and second control signals are respectively sourced via first and second control devices;
   wherein the first and second control devices are respectively controlled by third and fourth control signals derived from the differential current.

23. The power supply switching circuit of claim 17, wherein the first and second currents are different when a first power supply supplies power to the first power supply node and a second power supply supplies power to the second power supply node.

24. The power supply switching circuit of claim 17, wherein:
   the first switch is part of a first switch pair;
   the second switch is part of a second switch pair;
   the first and second switches, in the first and second switch pairs, are connected in series; and
   intrinsic body diodes of the first and second switches, in the first and second pairs, are oppositely connected.

25. The power supply switching circuit of claim 17, wherein the first and second switches and the switch control circuit are integrated on a single die.

26. The power supply switching circuit of claim 17, wherein:
   a first voltage, greater than a breakdown voltage of a transistor, at the first power supply node is provided to the first switch, and
   a second voltage, greater than the breakdown voltage, at the second power supply node is provided to the second switch.

27. The power supply switching circuit of claim 17, wherein the first and second switches comprise MOSFETs.

28. The power supply switching circuit of claim 17, wherein the switch control circuit is configured to:
   control the first switch to connect a first power supply at the first power supply node to the output node;
   control the second switch to isolate a second power supply at the second power supply node from the output node; and
   if an output of the first power supply is below a predetermined level,
      control the first switch to isolate the first power supply from the output node, and
      control the second switch to connect the second power supply to the output node.

29. The power supply switching circuit of claim 6, wherein the first and the second switches, in the first and second switch pairs, are connected in series, and intrinsic body diodes of the first and second switches, in the first and second switch pairs, are oppositely connected.

30. The power supply switching circuit of claim 6, wherein at least one of the second control signal or the fourth control signal is powered via the output node.

31. The power supply switching circuit of claim 6, wherein the first control signal is powered from the first power supply node, and the third control signal is powered from the second power supply node.

* * * * *

UNITED STATES PATENT AND TRADEMARK OFFICE
CERTIFICATE OF CORRECTION

PATENT NO. : 10,788,852 B2  
APPLICATION NO. : 16/093341  
DATED : September 29, 2020  
INVENTOR(S) : Filippo Neri Page 1 of 1

It is certified that error appears in the above-identified patent and that said Letters Patent is hereby corrected as shown below:

In the Claims

In Claim 6, Column 11, Line 29, "selective V connect" should read --selectively connect--.

In Claim 17, Column 12, Line 51, "a first source configured to provide a first, and" should read --a first current source configured to provide a first current, and--.

In Claim 18, Column 12, Line 59, "the first is generated" should read --the first current is generated--.

Signed and Sealed this  
Third Day of November, 2020

Andrei Iancu  
*Director of the United States Patent and Trademark Office*